US012705600B2

(12) United States Patent
Liu et al.

(10) Patent No.: US 12,705,600 B2
(45) Date of Patent: Aug. 11, 2026

(54) METHOD FOR BINDING CARD, TERMINAL DEVICE, AUTHENTICATION SERVER AND STORAGE MEDIUM

(71) Applicant: CHINA UNIONPAY CO., LTD., Shanghai (CN)

(72) Inventors: Gang Liu, Shanghai (CN); Cheng Peng, Shanghai (CN); Quan Sun, Shanghai (CN); Zhenzhong Zou, Shanghai (CN); Ailong Zhang, Shanghai (CN); Chengchu Zhan, Shanghai (CN); Hua Cai, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 11 days.

(21) Appl. No.: 18/008,618

(22) PCT Filed: Sep. 18, 2021

(86) PCT No.: PCT/CN2021/119367

§ 371 (c)(1),
(2) Date: Dec. 6, 2022

(87) PCT Pub. No.: WO2022/193594

PCT Pub. Date: Sep. 22, 2022

(65) Prior Publication Data

US 2023/0222484 A1 Jul. 13, 2023

(30) Foreign Application Priority Data

Mar. 17, 2021 (CN) ........................ 202110283629.1

(51) Int. Cl.
*G06Q 20/40* (2012.01)
*G06F 21/45* (2013.01)
(Continued)

(52) U.S. Cl.
CPC .......... *G06Q 20/341* (2013.01); *G06F 21/45* (2013.01); *G06Q 20/4014* (2013.01)

(58) Field of Classification Search
CPC .... G06Q 20/341; G06Q 20/20; G06Q 20/322; G06Q 20/4014; G06Q 20/40145;
(Continued)

(56) References Cited

U.S. PATENT DOCUMENTS

2014/0330722 A1 11/2014 Laxminarayanan et al.
2015/0142658 A1 5/2015 Li
(Continued)

FOREIGN PATENT DOCUMENTS

CA 2631305 A1 * 11/2008 ....... G06Q 20/40975
CA 3015041 C * 7/2019 ............ G06F 21/32
(Continued)

OTHER PUBLICATIONS

Hajny, "Performance Evaluation of Primitives for Privacy-Enhancing Cryptography on Current Smart-Cards and Smart-Phones" (Year: 2013).*
(Continued)

*Primary Examiner* — Thien T Mai
(74) *Attorney, Agent, or Firm* — ANOVA LAW GROUP, PLLC

(57) ABSTRACT

Embodiments of the present application provide a method for binding card, a terminal device, an authentication server and a storage medium. The method is applicable to terminal device including security element, and includes: obtaining a user identifier for logging in target application by a user and a secure element identifier of the secure element; sending the user identifier to an authentication server, wherein the user identifier is for the authentication server to search at least one first card bound to the user identifier; receiving card information of at least one first card sent by the authentica-
(Continued)

tion server; and sending a binding request to a card issuing server corresponding to card information, wherein the binding request comprises the card information, the user identifier and the secure element identifier, and the binding request is for the card issuing server to bind card information to the user identifier and the secure element identifier.

19 Claims, 10 Drawing Sheets

(51) Int. Cl.
*G06Q 20/32* (2012.01)
*G06Q 20/34* (2012.01)
*G06Q 20/36* (2012.01)

(58) Field of Classification Search
CPC ............. G06Q 20/326; G06Q 20/3226; G06Q 20/3224; G06Q 20/36; G06K 7/10237; G06K 19/07345; G06K 19/07749; G06K 19/07739; G06F 21/34; G06F 21/45; G06F 11/3037; G06F 21/77
See application file for complete search history.

(56) References Cited

U.S. PATENT DOCUMENTS

| | | | | |
|---|---|---|---|---|
| 2016/0078434 | A1* | 3/2016 | Huxham | G06Q 20/36 705/71 |
| 2016/0275485 | A1* | 9/2016 | Liu | G06Q 20/22 |
| 2018/0165670 | A1 | 6/2018 | Bacallao | |
| 2020/0372490 | A1* | 11/2020 | Ding | G06Q 20/3278 |
| 2021/0127436 | A1* | 4/2021 | Smets | H04W 76/11 |
| 2022/0294792 | A1* | 9/2022 | Patel | H04L 63/0861 |

FOREIGN PATENT DOCUMENTS

| | | | |
|---|---|---|---|
| CN | 102892102 | A | 1/2013 |
| CN | 104169952 | A | 11/2014 |
| CN | 104202167 | A | 12/2014 |
| CN | 107886320 | A | 4/2018 |
| CN | 108288168 | A | 7/2018 |
| CN | 109583883 | A | 4/2019 |
| CN | 110084586 | A | 8/2019 |
| CN | 110086609 | B | 10/2020 |
| CN | 111882317 | A | * 11/2020 |
| CN | 112118227 | A | 12/2020 |
| CN | 112232805 | A | 1/2021 |
| CN | 112669043 | A | 4/2021 |
| JP | 2015517151 | A | 6/2015 |
| TW | 202016850 | A | 5/2020 |

OTHER PUBLICATIONS

NFC Mobile Payment with Citizen Digital Certificate (Year: 2011).*
International Search Report and Written Opinion issued on Dec. 14, 2021 for International PCT application No. PCT/CN2021/119367.
The First Office Action issued on Apr. 26, 2021 for Chinese Patent Application No. 202110283629.1.
The Second Office Action issued on May 18, 2021 for Chinese Patent Application No. 202110283629.1.
The Third Office Action issued on Jun. 4, 2021 for Chinese Patent Application No. 202110283629.1.
Rejection Decision issued on Jun. 23, 2021 for Chinese Patent Application No. 202110283629.1.
The First Office Action issued on Nov. 8, 2022 for Taiwan Patent Application No. 110143407.
JPO; Notice for Reasons of Refusal for Japanese Patent Application No. 2022-564575 dated Nov. 16, 2023, 6 pages.
CNIPA; Concise Explanation of Relevance for TW—Rejection for Taiwanese Patent Application No. 110143407 dated Mar. 29, 2023, 9 pages.

* cited by examiner

FIG. 3

FIG. 7
verify bank card
verification code has been sent to your reserved mobile phone number in the bank, please operate according to the prompt
short message verification code
Next

METHOD FOR BINDING CARD, TERMINAL DEVICE, AUTHENTICATION SERVER AND STORAGE MEDIUM

CROSS REFERENCE TO RELATED APPLICATION

This application is a National Stage of International Application No. PCT/CN2021/119367, filed on Sep. 18, 2021, which claims priority to Chinese Patent Application No. 202110283629.1, filed on Mar. 17, 2021 and entitled "METHOD FOR BINDING CARD, TERMINAL DEVICE, AUTHENTICATION SERVER AND STORAGE MEDIUM". Both of the applications are incorporated herein by reference in their entireties for all purposes.

TECHNICAL FIELD

The present application relates to a field of data processing, and in particular, to a method for binding card, a terminal device, an authentication server and a storage medium.

BACKGROUND

With a continuous development of information technology, a user may complete a payment transaction through a terminal device. Before making the payment transaction, the user needs to bind a card used for the payment transaction, such as a bank card, a transportation card, or a membership card, to the terminal device, so that the card may be used during the payment transaction through the terminal device.

However, when the user changes to use a new terminal device, the user needs to refill card information to complete a binding of the card to this terminal device. The whole process is cumbersome and the user experience is poor.

SUMMARY

Embodiments of the present application provide a method for binding card, a terminal device, an authentication server and a storage medium.

In one aspect, an embodiment of the present application provides a method for binding card, applicable to a terminal device including a security element, the method including: obtaining a user identifier for logging in a target application by a user and a secure element identifier of the secure element; sending the user identifier to an authentication server, wherein the user identifier is for the authentication server to search at least one first card bound to the user identifier; receiving card information of the at least one first card sent by the authentication server; and sending a binding request to a card issuing server corresponding to the card information, wherein the binding request includes the card information, the user identifier and the secure element identifier, and the binding request is for the card issuing server to bind the card information to the user identifier and the secure element identifier.

In another aspect, an embodiment of the present application provides a method for binding card, applicable to an authentication server, the method including: receiving a user identifier sent by a terminal device and for logging in a target application by a user; searching at least one first card bound to the user identifier; and sending card information of the at least one first card to the terminal device, wherein the card information is for the terminal device to send a binding request to a card issuing server corresponding to the card information, wherein the binding request includes the card information, the user identifier and a secure element identifier of a secure element of the terminal device, and the binding request is for the card issuing server to bind the card information to the user identifier and the secure element identifier.

In another aspect, an embodiment of the present application provides a terminal device including a secure element, including: an obtaining module configured to obtain a user identifier for logging in a target application by a user and a secure element identifier of the secure element; a sending module configured to send the user identifier to an authentication server, wherein the user identifier is for the authentication server to search at least one first card bound to the user identifier; and a receiving module configured to receive card information of the at least one first card sent by the authentication server, wherein the sending module is further configured to send a binding request to a card issuing server corresponding to the card information, wherein the binding request includes the card information, the user identifier and the secure element identifier, and the binding request is for the card issuing server to bind the card information to the user identifier and the secure element identifier.

In another aspect, an embodiment of the present application provides an authentication server, including: a receiving module configured to receive a user identifier sent by a terminal device and for logging in a target application by a user; a searching module configured to search at least one first card bound to the user identifier; and a sending module configured to send card information of the at least one first card to the terminal device, wherein the card information is for the terminal device to send a binding request to a card issuing server corresponding to the card information, wherein the binding request includes the card information, the user identifier and a secure element identifier of a secure element of the terminal device, and the binding request is for the card issuing server to bind the card information to the user identifier and the secure element identifier.

In another aspect, an embodiment of the present application provides a device for binding card, including: a processor and a memory storing computer program instructions, wherein the processor is configured to implement, when executing the computer program instructions, the method for binding card according to the first aspect; or the processor is configured to implement, when executing the computer program instructions, the method for binding card according to the second aspect.

In another aspect, an embodiment of the present application provides a computer-readable storage medium on which computer program instructions are stored, wherein the computer program instructions, when executed on a processor, cause the processor to implement the method for binding card according to the first aspect; or the computer program instructions, when executed on a processor, cause the processor to implement the method for binding card according to the second aspect.

BRIEF DESCRIPTION OF THE DRAWINGS

In order to explain the technical solutions of the embodiments of the present application more clearly, the following briefly introduces the drawings that need to be used in the embodiments of the present application. For those ordinary skilled in the art, other drawings may further be obtained from these drawings without the exercise of inventive faculty.

FIG. 3 is a first schematic diagram of an interface for binding card involved in the present application;

DETAILED DESCRIPTION

Figure 1:
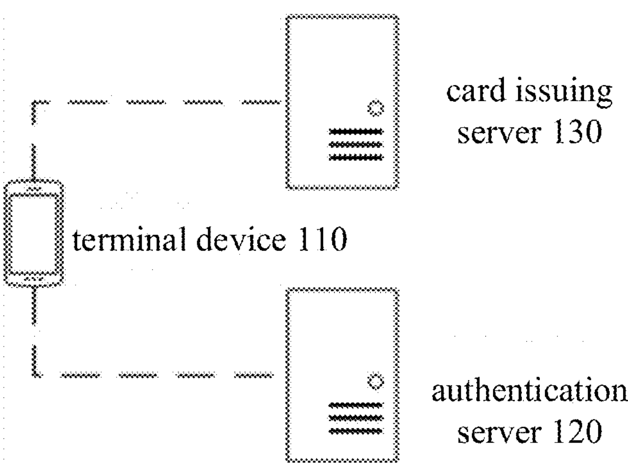
FIG. 1 is a schematic diagram of an architecture of a system for binding card involved in the present application.

The features and exemplary embodiments of various aspects of the present application will be described in detail below. In order to make the purpose, technical solutions and advantages of the present application more clear, the present application will be further described in detail below with reference to the accompanying drawings and specific embodiments. It should be understood that the specific embodiments described herein are only to explain the present application, and are not to limit the present application. It will be apparent to those skilled in the art that the present application may be practiced without some of these specific details. The following description of the embodiments is merely to provide a better understanding of the present application by illustrating examples of the present application.

It should be noted that, relational terms such as first and second herein are only used to distinguish one entity or operation from another entity or operation, and do not necessarily require or imply that any such relationship or sequence actually exists among these entities or operations. In addition, the terms "include", "comprise" or any other variation thereof are intended to encompass non-exclusive inclusion, such that a process, method, article or device which includes a list of elements includes not only those elements, but also other elements which are not explicitly listed or elements inherent to such process, method, article or device. Without further limitation, an element defined by the phrase "include" does not preclude the presence of additional identical elements in the process, method, article, or device that includes the element.

Currently, when a user changes to use a new terminal device, the user needs to refill card information to complete a binding of the card to this terminal device. The whole process is cumbersome and the user experience is poor.

In order to solve the technical problem that the card binding process is cumbersome, the embodiments of the present application provide a method for binding card, a terminal device, an authentication server, and a storage medium. First, the terminal device may obtain a user identifier for logging in a target application by a user and a secure element identifier of the secure element, and send the user identifier to the authentication server. Then the authentication server searches at least one first card bound to the user identifier, and sends card information of the at least one first card to the terminal device. Then, the terminal device sends a binding request to a card issuing server corresponding to the card information, wherein the binding request includes the card information, the user identifier and the secure element identifier. Further, the card issuing server binds the card information to the user identifier and the secure element identifier. In this way, the card information of the first card bound to the user identifier may be obtained quickly, and the binding of the first card to the terminal device may be realized based on the card information, without requiring the user to repeatedly input the card information, which improves the card binding efficiency.

The method for binding card, the terminal device, the authentication server, and the storage medium provided by the embodiments of the present application will be described in detail below with reference to the accompanying drawings through specific embodiments and application scenarios thereof.

As an example, the method for binding card provided by the embodiments of the present application may be applicable to a card binding scenario when an electronic device such as a mobile phone, a tablet computer, a notebook computer, or a personal computer is to be changed. The embodiments of the present application are not limited in this regard.

FIG. 1 is a schematic diagram of an architecture of a system for binding card involved in the present application. As shown in FIG. 1, the system for binding card may include a terminal device 110, an authentication server 120 and a card issuing server 130, which is not limited herein.

The terminal device 110 may be a terminal device with a payment transaction function, e.g., a mobile phone, a tablet computer, a wearable device, or the like. A target application for payment transaction is installed on it, and the payment transaction may be realized through the target application by the user. Further, the terminal device 110 may include a secure element (SE).

The authentication server 120 and the card issuing server 130 may be a single server, a server cluster, or a cloud server, which has an ability to store and process data. Exemplarily, the card issuing server 130 may be a server corresponding to a card issuing institution, e.g., a server corresponding to a bank card issuing bank.

As shown in FIG. 1, the terminal device 110 communicates with the authentication server 120 and the card issuing server 130, respectively. Optionally, a communication manner may be a wired communication or a wireless communication.

As an example, first, the terminal device 110 may obtain the user identifier (User Identification, UID) for logging in the target application by the user and the secure element identifier (Secure Element Identity, SEID) of the secure element, and send the user identifier to the authentication server. Exemplarily, the target application is an application for payment transactions, for example, the target application may be a wallet application. The user identifier may be a user account for logging in the target application by the user. The secure element identifier may be used for uniquely representing the SE, and thus the terminal device 110.

Then, the authentication server 120 searches at least one first card bound to the user identifier, and sends card information of the at least one first card to the terminal device 110. Exemplarily, the first card may be a bank card, a transportation card, a membership card or the like, which has previously bound to the user identifier, and the card information may include a card number, and may further include a card issuer, an expiration date, or the like.

Then, the terminal device 110 sends a binding request to the card issuing server 130 corresponding to the card information. The binding request includes the card information, the user identifier and the secure element identifier.

Further, the card issuing server 130 binds the card information to the user identifier and the secure element identifier. In this way, the card information of the first card bound to the user identifier may be obtained quickly, and the binding of the first card to the terminal device may be realized based on the card information, without requiring the user to repeatedly input the card information, and thus the card binding efficiency is improved.

The method for binding card provided by the embodiments of the present application will be described in detail below. The method for binding card may be applicable to the system for binding card shown in FIG. 1.

Figure 2:
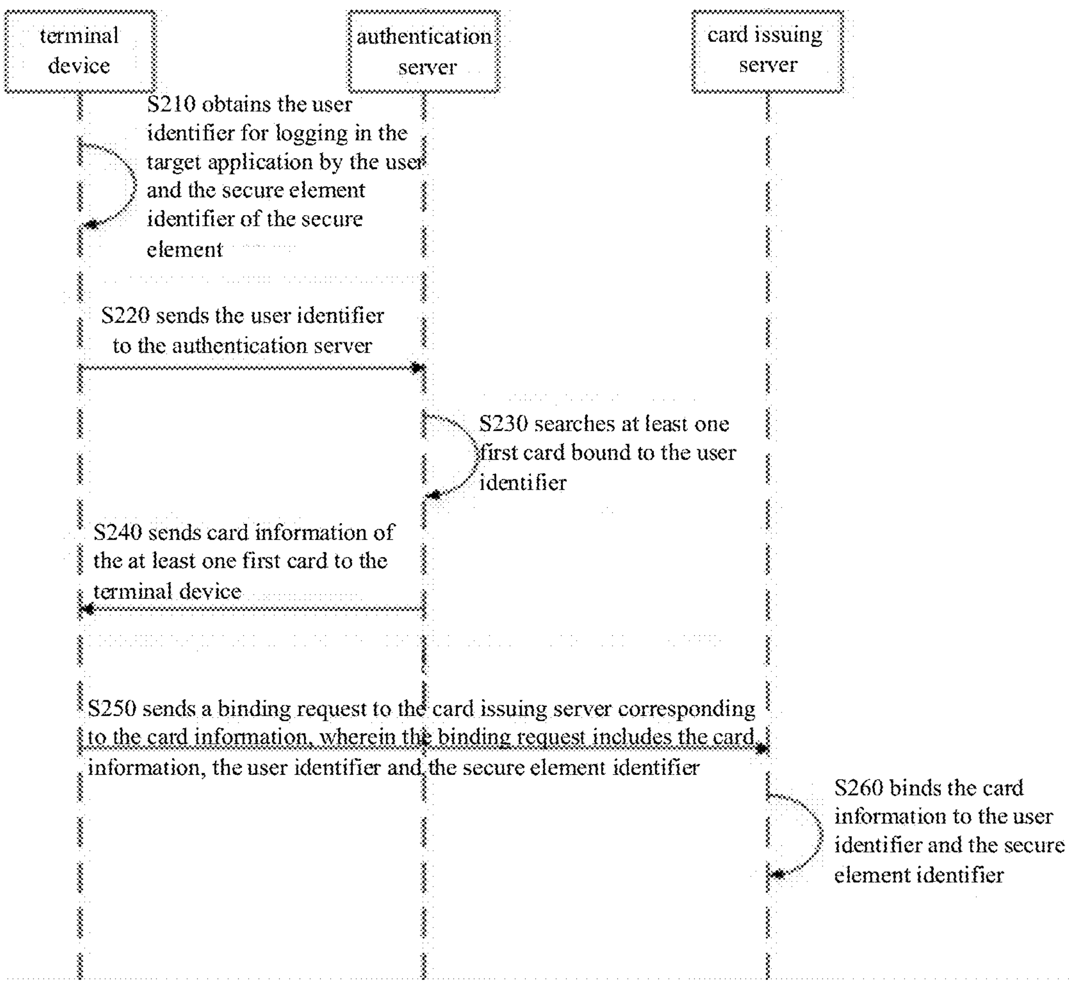
FIG. 2 is a schematic flowchart of an embodiment of a method for binding card involved in the present application.

FIG. 2 is a schematic flowchart of an embodiment of a method for binding card involved in the present application. As shown in FIG. 2, the method for binding card may include the following steps.

In S210, the terminal device obtains the user identifier for logging in the target application by the user and the secure element identifier of the secure element.

In one embodiment, when a target application interface is displayed, the terminal device may receive an input for a card binding option by the user, and in response to the input, obtain the user identifier for logging in the target application by the user and the secure element identifier of the secure element. The target application may be an application for payment transactions, e.g., a wallet application. The user identifier may be a user account required for logging in the target application by the user. The secure element identifier may be used for uniquely representing the SE, and thus the terminal device.

Exemplarily, the user may open the wallet application, log in the user account on the wallet application, and when the card binding option is clicked by the user, the terminal device obtains the user account for logging in the wallet application by the user and the secure element identifier of the secure element.

As shown in FIG. 2, the method for binding card may further include that: in S220, the terminal device sends the user identifier to the authentication server.

As shown in FIG. 2, the method for binding card may further include that: in S230, the authentication server searches at least one first card bound to the user identifier.

The authentication server receives the user identifier sent by the terminal device, and then searches at least one first card bound to the user identity. The first card may be a bank card, a transportation card, or a membership card or the lick, which has previously bound to the user identifier, and the card information may include a card number, and may further includes a card issuer, an expiration date, CVN2, OTP, or the like.

Optionally, the authentication server may search the at least one first card bound to the user identifier based on a preset binding relationship between at least one user identifier and card(s). The binding relationship between the user identifier and the card is used for representing a binding between the user identifier and the card.

Optionally, under a condition that a real-name authentication on the user is determined to be not passed based on the user identifier, the authentication server may generate an identity information obtaining request, and send the identity information obtaining request to the terminal device. The terminal device receives the identity information obtaining request sent by the authentication server; obtains identity information of the user in response to the identity information obtaining request, and sends the identity information to the authentication server. Exemplarily, the identity information may include a name, an identification card number, and a biometric feature. The biometric feature may be a facial feature, a fingerprint feature, or an iris feature, etc. The authentication server receives the identity information sent by the terminal device, performs a real-name authentication on the user based on the identity information, searches at least one second card corresponding to the identity information of the user under a condition that the real-name authentication on the user is passed, and determines the at least one first card bound to the user identifier from the at least one second card. In this way, in a case that a real-name authentication on the user is not passed, another real-name authentication on the user may be performed, and a card to be bound may be determined based on the identity information for which the real-name authentication is passed, and thus a security for binding card is improved.

Optionally, authentication server may search at least one second card corresponding to identity information of the user under a condition that a real-name authentication on the user is determined to be passed based on the user identifier, and determine the at least one first card bound to the user identifier from the at least one second card. The identity information is stored after the real-name authentication on the user is passed. In this way, in a case that a real-name authentication on the user is passed, another real-name authentication on the user may be performed, and a card to be bound may be determined based on the identity information for which the real-name authentication is passed, and thus the security for binding card is improved.

As an example, the authentication server may search, based on a preset binding relationship between at least one user identifier and a result(s) of passed real-name authentication, whether there is a result of passed real-name authentication bound to the user identifier. The binding relationship between the user identifier(s) and the result(s) of the passed real-name authentication is to represent a binding between the user identifier and the result of the passed real-name authentication. If there is not a result of passed real-name authentication success corresponding to the user identifier, it is determined that the real-name authentication on the user is not passed. In this case, the authentication server may generate the identity information obtaining request and send this request to the terminal device.

The terminal device receives the identity information obtaining request sent by the authentication server, and displays an identity information acquisition interface on a screen of the terminal device in response to the request. The identity information acquisition interface may include an identity information input area and an authorization area. The user may click the authorization area to express consent to authorization, and may input the identity information in the identity information input area. Optionally, the terminal device may also display pre-stored identity information for the user to select, free from user input. The terminal device receives the identity information input by the user and sends the information to the authentication server.

The authentication server receives the identity information sent by the terminal device, and performs the real-name authentication on the user based on the information. Specifically, the authentication server may retrieve a target biometric feature corresponding to a name and an identification card number in the identity information from a database storing the biometric features, and match a biometric feature in the identity information with the target biometric feature. If the matching is succeeded, the real-name authentication is passed; and if the matching is failed, the real-name authentication is not passed. Under a condition that the real-name authentication on the user is passed, a binding relationship between the user identifier and the result of the passed real-name authentication is stored, and based on a preset binding relationship between at least one piece of the identity information and card(s), the at least one second card bound to the identity information of the user is searched. The binding relationship between the identity information and the card is to represent a binding between the identity information and the card. Then, the at least one first card bound to the user identifier is determined from the at least one second card.

If there is a result of the passed real-name authentication corresponding to the user identifier, it is determined that an identity authentication on the user is passed. In this case, the authentication server searches the at least one second card bound to the identity information of the user based on the preset binding relationship between the at least one piece of the identity information and the card(s). The identity information is stored after the real-name authentication on the user is passed. Then, the at least one first card bound to the user identifier is determined from the at least one second card.

As shown in FIG. 2, the method for binding card may further include that: in S240, the authentication server sends card information of the at least one first card to the terminal device.

In one embodiment, the authentication server may send a card list to the terminal device. The card list may include the card information of the at least one first card.

As shown in FIG. 2, the method for binding card may further include that: in S250, the terminal device sends a binding request to a card issuing server corresponding to the card information.

The terminal device receives the card information of the at least one first card sent by the authentication server, and referring to the example shown in S240, may receive the card list including the card information of the at least one first card sent by the authentication server, and then send the binding request to the card issuing server corresponding to the card information. The binding request includes the card information, the user identifier and the secure element identifier.

Optionally, the terminal device may display each of pieces of the card information for the user to select. The user may select the card information by clicking. In this case, the terminal device receives an input for selecting the card information by the user, and send, in response to the input, binding requests to card issuing servers corresponding to selected pieces of the card information respectively. In this way, the user may select a desired card to be bound on his/her own, and thus a use experience of the user is improved.

Optionally, the system for binding card shown in FIG. 1 may further include a trusted service management (TSM) server. The terminal device may send the binding request corresponding to the card information to the TSM server, and the TSM server sends the request to the card issuing server corresponding to the card information. In this way, the binding request may be forwarded through the TSM server, which improves the security for binding card.

As shown in FIG. 2, the method for binding card may further include that: in S260, the card issuing server binds the card information to the user identifier and the secure element identifier.

The card issuing server receives the binding request sent by the terminal device, and in response to the request, binds the card information to the user identifier and the secure element identifier. Exemplarily, the card issuing server may first perform an information verification on the card information, and in a case of a successful verification, bind the card information to the user identifier and the secure element identifier, and establish a mapping relationship between the card information and the user identifier and the secure element identifier, and may send a successful binding notification to the terminal device.

In an embodiment of the present application, first, the terminal device may obtain a user identifier for logging in the target application by the user and the secure element identifier of the secure element, and send the user identifier to the authentication server. Then the authentication server searches at least one first card bound to the user identifier, and sends the card information of the at least one first card to the terminal device. Then, the terminal device sends the binding request to the card issuing server corresponding to the card information, wherein the binding request includes the card information, the user identifier and the secure element identifier. Further, the card issuing server binds the card information to the user identifier and the secure element identifier. In this way, the card information of the first card bound to the user identifier may be obtained quickly, and the binding of the first card to the terminal device may be realized based on the card information, without requiring the user to repeatedly input the card information, which improves the card binding efficiency.

In one embodiment, referring to the example shown in S230, the terminal device may further send the secure element identifier to the authentication server. The authentication server receives the secure element identifier sent by the terminal device, and stores and binds the result of the passed real-name authentication, the user identifier and the secure element identifier with one another. This may be used for quickly determining the real-name authentication status for the terminal device when performing other services subsequently.

Optionally, the system for binding card shown in FIG. 1 may further include a backend server, the authentication server may include an identity recognition server and a real-name authentication server, and the identity recognition server communicates with the real-name authentication server. The method for binding card provided by the embodiments of the present application will be described in detail below with reference to a specific example, and the details are as follows.

Figure 3:
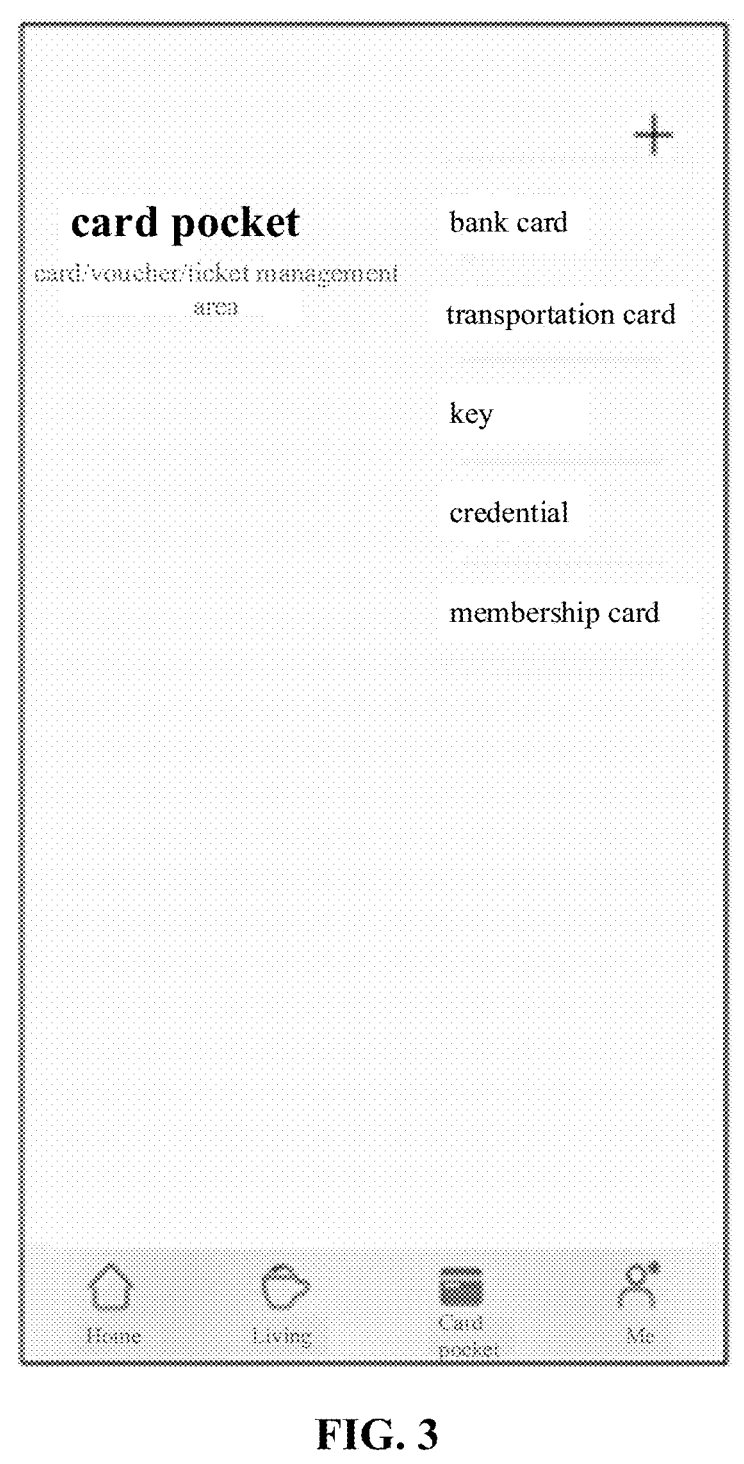

As shown in FIG. 3, the user may open a wallet application, i.e., the target application. When the user clicks a card binding option such as the "bank card" option, the terminal device obtains the user identifier for logging in the wallet application by the user and the secure element identifier of the secure element. The terminal device may send a user account and the secure element identifier to the backend server corresponding to the wallet application, and the backend server sends the user identifier and the secure element identifier to the identity recognition server.

The identity recognition server may determine whether a real-name authentication on the user is passed based on the user identifier, generate an identity information obtaining request under a condition that the real-name authentication on the user is not passed, and send the request to the backend server, and the backend server sends the request to the terminal device.

Figure 4:
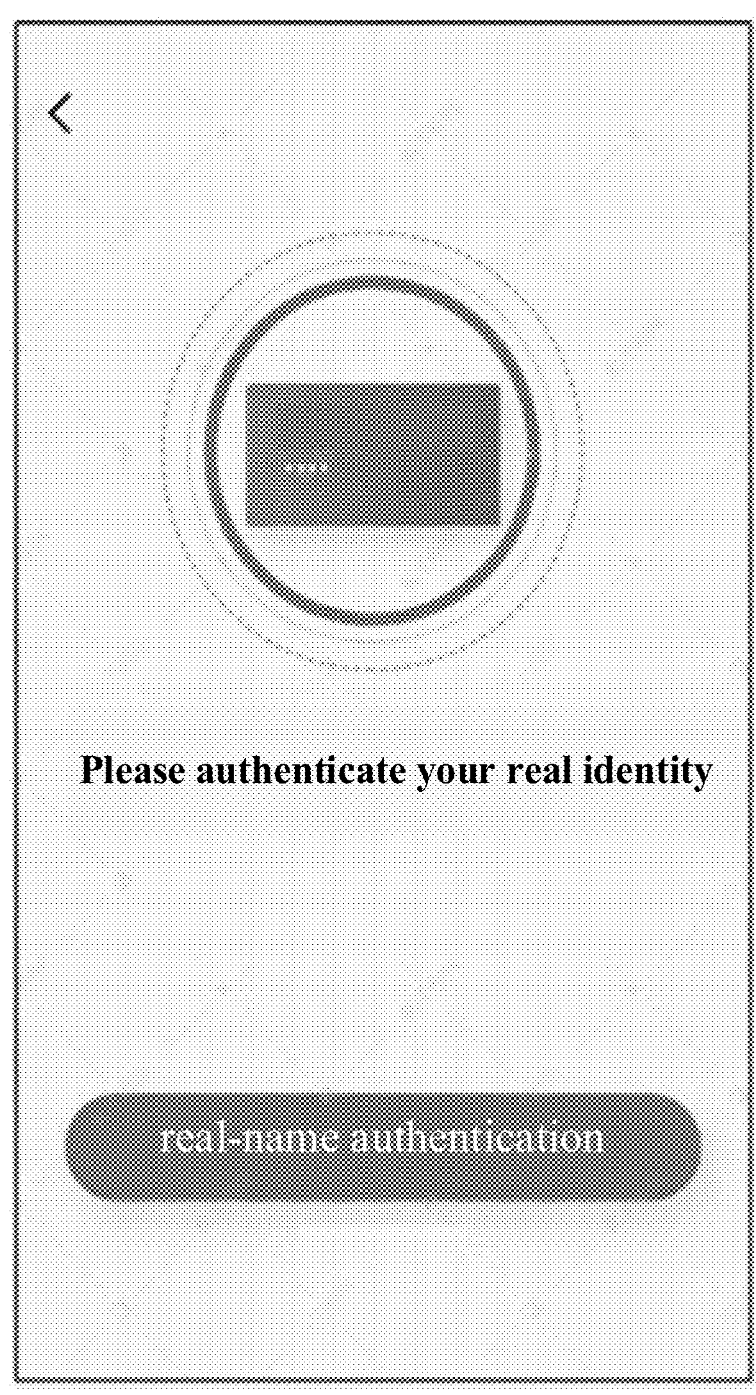
FIG. 4 is a second schematic diagram of an interface for binding card involved in the application.
Figure 5:
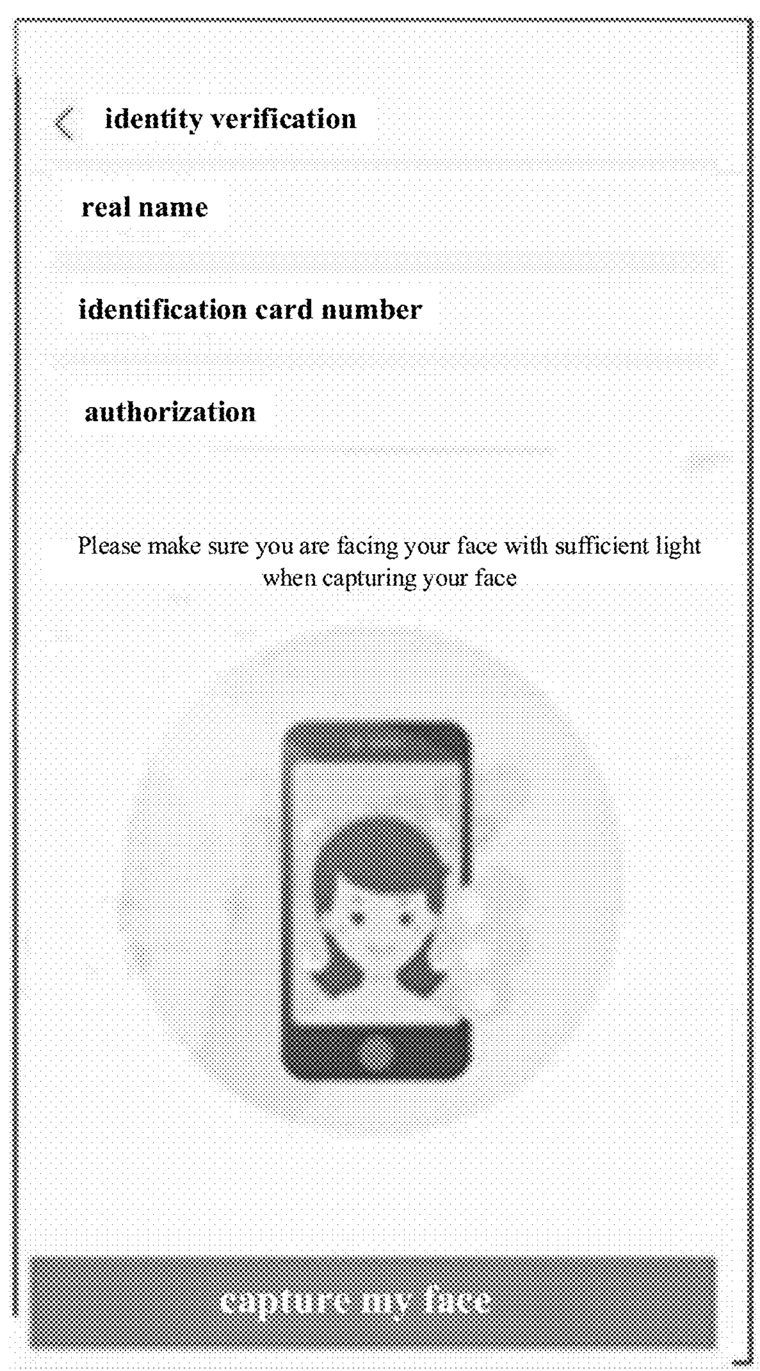
FIG. 5 is a third schematic diagram of an interface for binding card involved in the application.

As shown in FIG. 4, in response to the identity information obtaining request, the terminal device may display a prompt interface to remind the user to perform the real-name authentication. When the user clicks a "real-name authentication" option, the terminal device may display an identity information acquisition interface, as shown in FIG. 5. The user may fill in corresponding information in a "real name" area, an "identification card number" area and an "authorization" area, and click a "capture my face" option to capture the face, so as to obtain the identity information including a name, an identification card number and a facial feature. The terminal device sends the identity information to the backend server, the backend server sends the information to the identity recognition server, and the identity recognition server sends the information to the real-name authentication server.

The real-name authentication server may perform a real-name authentication on the user based on the information, and send, under a condition that the real-name authentication on the user is passed, the result of the passed real-name authentication to the identity recognition server. The identity recognition server sends the result to the backend server, and the backend server sends the result to the terminal device. At the same time, the identity recognition server searches the at least one second card bound to the identity information, and then determines the at least one first card bound to the user identity from the at least one second card, and then sends the card list including the card information of the at least one first card to the terminal device.

Figure 6:
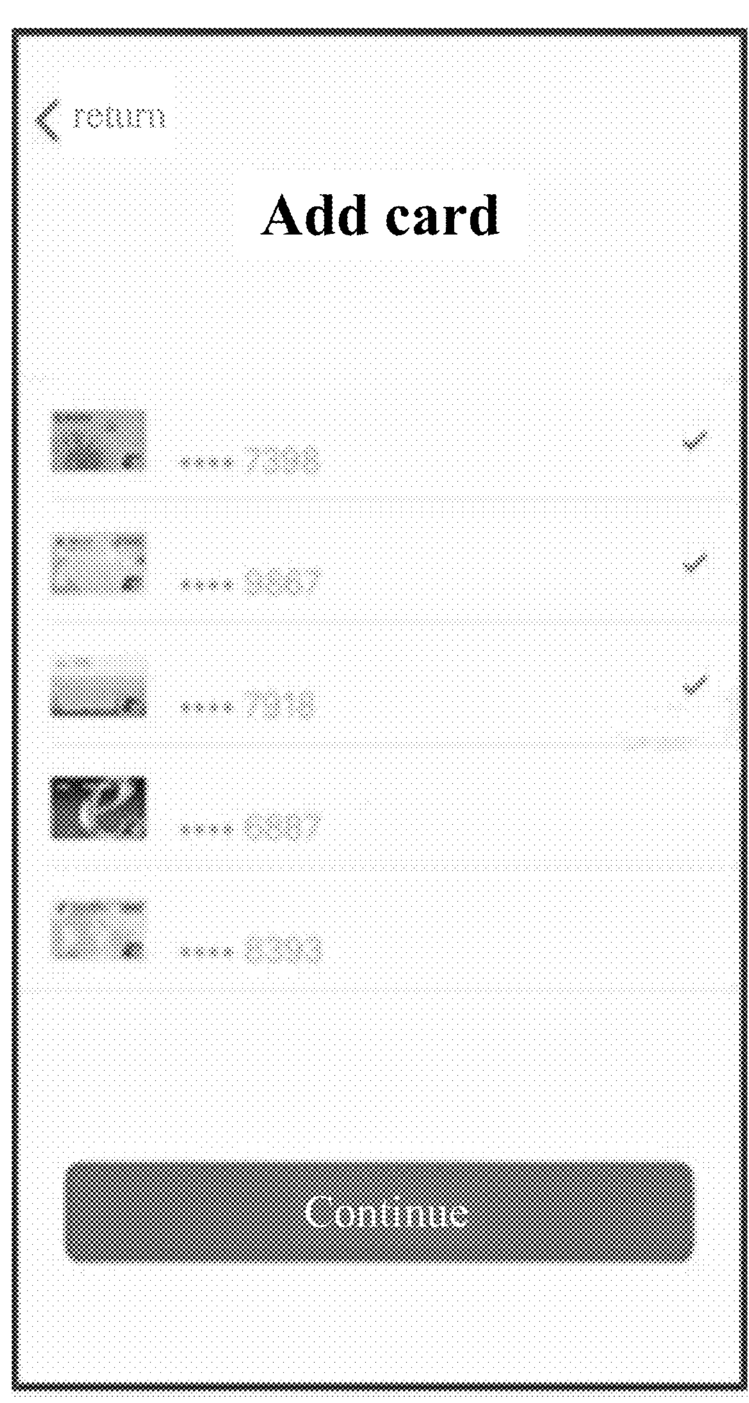
FIG. 6 is a fourth schematic diagram of an interface for binding card involved in the application.

As shown in FIG. 6, the terminal device may display the card list, i.e., the card information of each first card, for the user to select. The user may select the card information, that is, the card represented by the selected card information, by clicking. As shown in FIG. 6, a first three pieces of the card information are pieces of the card information selected by the user. When the user clicks a "Continue" option, the terminal device sends the binding requests corresponding to the selected pieces of the card information to the TSM server, and the TSM server sends the requests to the card issuing servers corresponding to the selected pieces of card information. The request may further include a card binding service identifier, which is to represent a card binding process.

In response to the request, the card issuing server may perform an information verification on the card information, and specifically, may send a short message verification code to a reserved mobile phone number corresponding to the card information.

Figure 7:
FIG. 7 is a fifth schematic diagram of an interface for binding card involved in the application.
Figure 8:
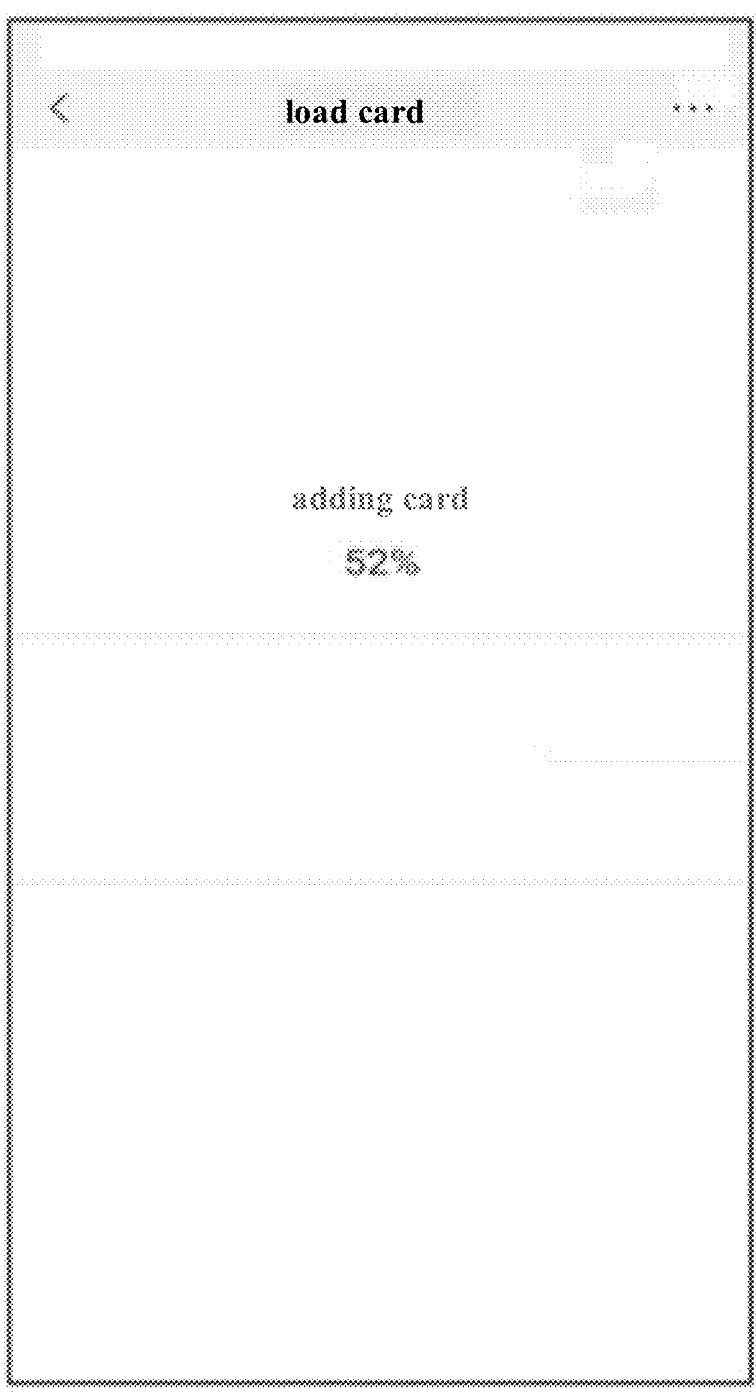
FIG. 8 is a sixth schematic diagram of an interface for binding card involved in the application.

As shown in FIG. 7, after the user clicks the "Continue" option, the terminal device displays a verification interface including a "short message verification code" area for the user to input a received short message verification code. After inputting the short message verification code, the user clicks a "Next" option, and the terminal device sends the short message verification code input by the user to the card issuing server. At this time, the terminal device may display an interface as shown in FIG. 8, to display a card binding progress for the user in a form of a progress bar.

Figure 9:
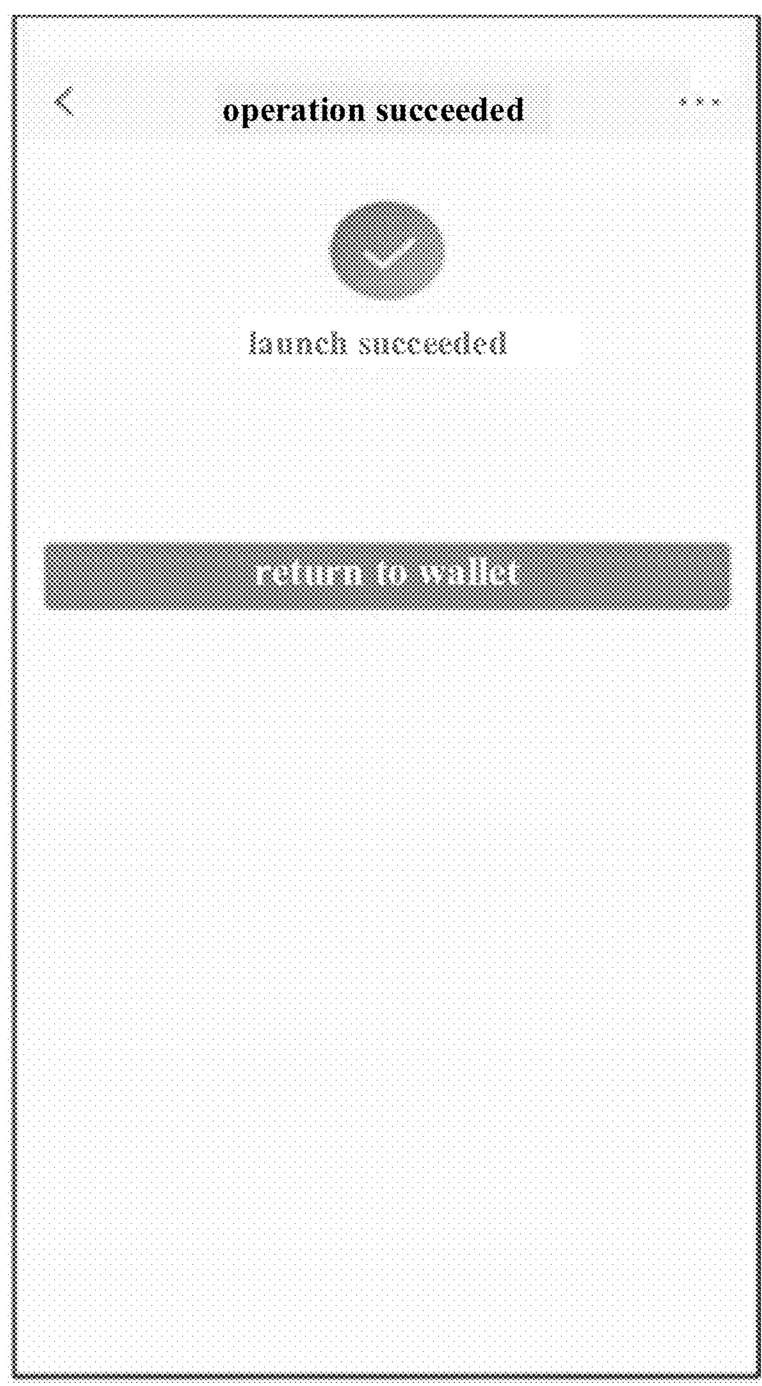
FIG. 9 is a seventh schematic diagram of an interface for binding card involved in the application.

Under a condition that the received short message verification code is the same as the sent short message verification code, the card issuing server may bind the card information to the user identifier and the secure element identifier, establish a mapping relationship between the card information and the user identifier and the secure element identifier, and send a successful binding notification to the TSM The server, and the TSM server sends the notification to the terminal device. In response to the successful binding notification, the terminal device displays information of the successful binding. As shown in FIG. 9, it may display "launch succeeded".

Figure 10:
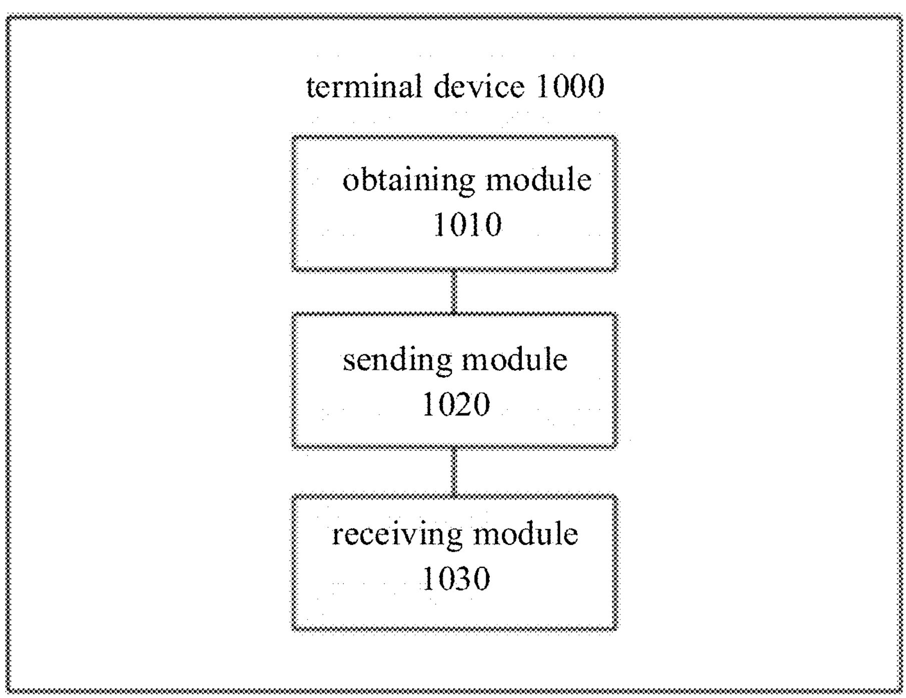
FIG. 10 is a schematic structure diagram of an embodiment of a terminal device involved in the present application.

Based on the method for binding card provided by the embodiments of the present application, the embodiments of the present application further provide a terminal device, which includes a security element. As shown in FIG. 10, the terminal device 1000 may include: an obtaining module 1010, a sending module 1020 and a receiving module 1030.

The obtaining module 1010 is configured to obtain the user identifier for logging in the target application by the user and the secure element identifier of the secure element.

The sending module 1020 is configured to send the user identifier to the authentication server, wherein the user identifier is for the authentication server to search at the least one first card bound to the user identifier.

The receiving module 1030 is configured to receive the card information of the at least one first card sent by the authentication server.

The sending module 1020 is further configured to send the binding request to the card issuing server corresponding to the card information, wherein the binding request includes the card information, the user identifier and the secure element identifier, and the binding request is for the card issuing server to bind the card information to the user identifier and the secure element identifier.

In one embodiment, the receiving module 1030 is further configured to receive the identity information obtaining request sent by the authentication server, wherein the identity information obtaining request is generated by the authentication server under a condition that a real-name authentication on the user is determined to be not passed based on the user identifier.

The obtaining module 1010 may further be configured to obtain the identity information of the user in response to the identity information obtaining request.

The sending module 1020 may further be used to send the identity information to the authentication server, wherein the identity information is for the authentication server to perform a real-name authentication on the user based on the identity information, to search at least one second card bound to the identity information of the user under a condition that the real-name authentication on the user is passed, and to determine the at least one first card bound to the user identifier from the at least one second card.

In one embodiment, the sending module 1020 is further configured to send the secure element identifier to the authentication server, so that the authentication server is to store and bind a result of the passed real-name authentication, the user identifier and the secure element identifier with one another.

In one embodiment, the obtaining module 1010 particularly includes: a first display unit configured to display an identity information acquisition interface on a screen of the terminal device in response to the identity information obtaining request; and a first receiving unit configured to receive the identity information input by the user.

In one embodiment, the sending module 1020 particularly includes: a second display unit configured to display each of pieces of the card information; a second receiving unit configured to receive an input for selecting the card information by the user; and a first sending unit configured to send, in response to the input, binding requests to card issuing servers corresponding to selected pieces of the card information respectively.

In one embodiment, the sending module 1020 particularly includes: a second sending unit configured to send the binding request corresponding to the card information to the TSM server, so that the TSM server is to send the binding request to the card issuing server corresponding to the card information.

It may be understood that each module/unit in the terminal device 1000 shown in FIG. 10 has functions for realizing respective steps performed by the terminal device in FIG. 2 and may achieve corresponding technical effect thereof. For brevity, it will not be repeated here.

Figure 11:
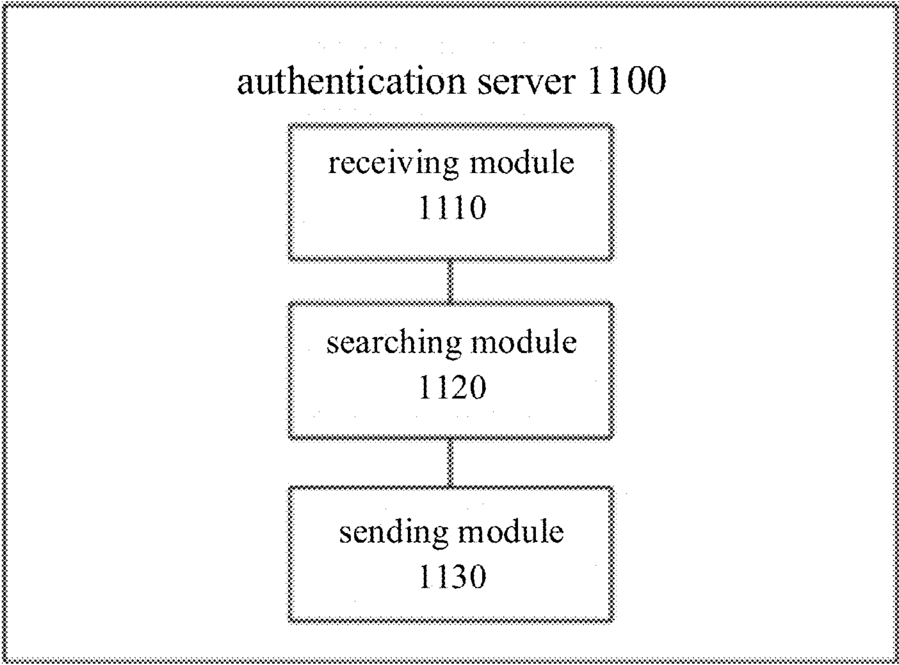
FIG. 11 is a schematic structure diagram of an embodiment of an authentication server involved in the present application.

Based on the method for binding card provided by the embodiments of the present application, the embodiments of the present application further provide an authentication server. As shown in FIG. 11, the authentication server 1100 may include: a receiving module 1110, a searching module 1120 and a sending module 1130.

The receiving module 1110 is configured to receive the user identifier sent by the terminal device and for logging in the target application by the user.

The searching module 1120 is configured to search at least one first card bound to the user identifier.

The sending module 1130 is configured to send the card information of the at least one first card to the terminal device, wherein the card information is for the terminal device to send the binding request to the card issuing server corresponding to the card information, wherein the binding request includes the card information, the user identifier and a secure element identifier of the secure element of the terminal device, and the binding request is for the card issuing server to bind the card information to the user identifier and the secure element identifier.

In one embodiment, the searching module 1120 particularly includes: a generating unit configured to generate the identity information obtaining request under a condition that a real-name authentication on the user is determined to be not passed based on the user identifier; a sending unit configured to send the identity information obtaining request to the terminal device, so that the terminal device is to obtain the identity information of the user; a receiving unit configured to receive the identity information sent by the terminal device; an authentication unit configured to perform a real-name authentication on the user based on the identity information; a first searching unit configured to search at least one second card bound to the identity information of the user under a condition that the real-name authentication on the user is passed; and a first determining unit configured to determine the at least one first card bound to the user identifier from the at least one second card.

In one embodiment, the searching module 1120 particularly includes: a second search unit configured to search at least one second card bound to the identity information of the user under a condition that a real-name authentication on the user is determined to be passed based on the user identifier; and a second determining unit configured to determine the at least one first card bound to the user identifier from the at least one second card.

In one embodiment, the receiving module 1110 is further configured to receive the secure element identifier sent by the terminal device.

Authentication server 1100 may further include: a storage module configured to store and bind the result of the passed real-name authentication, the user identifier and the secure element identifier with one another.

It may be understood that each module/unit in the authentication server 1100 shown in FIG. 11 has functions for realizing respective steps performed by the authentication server in FIG. 2, and may achieve corresponding technical effect thereof. For brevity, it will not be repeated here.

Figure 12:
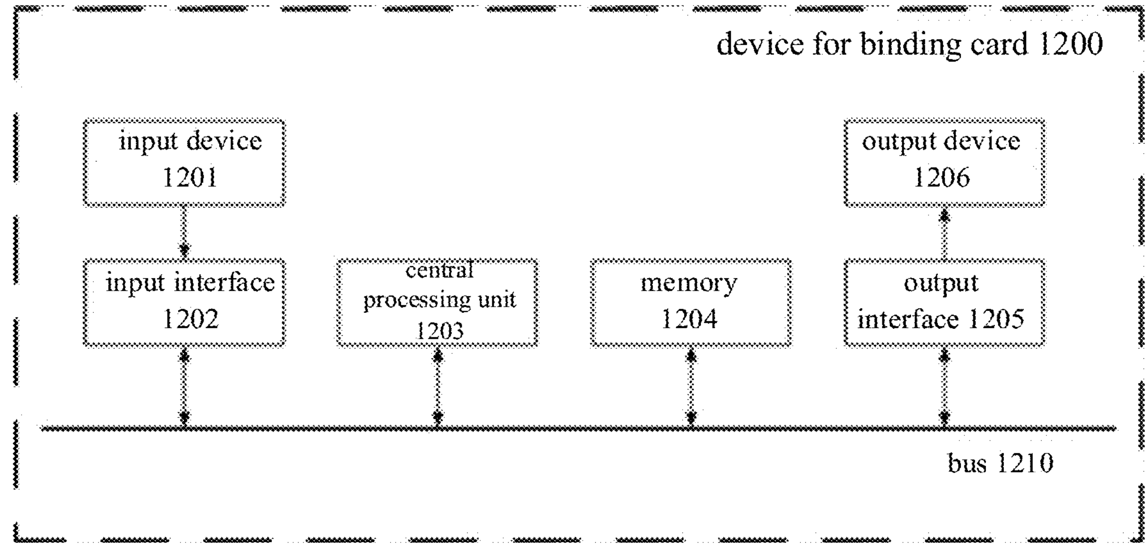
FIG. 12 is a schematic structure diagram of an embodiment of a device for binding card involved in the present application.

FIG. 12 is a schematic structure diagram of an embodiment of a device for binding card involved in the present application.

As shown in FIG. 12, the device for binding card 1200 in this embodiment includes an input device 1201, an input interface 1202, a central processing unit 1203, a memory 1204, an output interface 1205, and an output device 1206. The input interface 1202, the central processing unit 1203, the memory 1204, and the output interface 1205 are connected with one another via a bus 1210, and the input device 1201 and the output device 1206 are connected to the bus 1210 via the input interface 1202 and the output interface 1205, respectively, and then connected to other components of the device for binding card 1200.

Specifically, the input device 1201 receives input information from outside, and transmits the input information to the central processing unit 1203 through the input interface 1202; the central processing unit 1203 processes the input information based on computer-executable instructions stored in the memory 1204 to generate output information, temporarily or permanently store the output information in the memory 1204, and then transmit the output information to the output device 1206 through the output interface 1205; and the output device 1206 outputs the output information to the outside of the device for binding card 1200 for the user to use.

In one embodiment, the device for binding card 1200 shown in FIG. 12 includes: a memory 1204 for storing a program; and a processor 1203 for executing the program stored in the memory to implement the method for binding card provided by the embodiments of the present application.

The embodiments of the present application further provide a computer-readable storage medium on which computer program instructions are stored; the computer program instructions, when executed by a processor, cause the processor to implement the method for binding card provided by the embodiments of the present application. Examples of computer-readable storage medium include a non-transitory computer-readable storage medium, e.g., a read-only memory (ROM), a random access memory (RAM), a magnetic disk or optical disk, and the like.

It should be noted that respective embodiments in the present application are described in a progressive manner, and the same or similar parts of the various embodiments may be referred to one another, which are not repeated for brevity. The present application is not limited to the specific configuration and processes described above and shown in the figures. For brevity, the detail descriptions for the known method are omitted here. In the above embodiments, some specific steps are described and shown as examples. However, the method process of the present application is not limited to the described and shown specific steps, and after understanding the spirit of the present application, those skilled in the art may implement various changes, modifications and additions or changes of the sequences of the steps.

The functional block shown in the above-described structure block diagrams may be implemented as a hardware, a software, a firmware, or a combination thereof. When implemented in a hardware, it may be, for example, an electronic circuit, an application specific integrated circuit (ASIC), a suitable firmware, a plug-in, a function card, and the like. When implemented in a software, elements of the present application are programs or code segments used for performing required tasks. The programs or code segments may be stored in a machine-readable medium or transmitted over a transmission medium or communication link by a data signal carried in a carrier wave. A "machine-readable medium" may include any medium that may store or transmit information. Examples of machine-readable medium include an electronic circuit, a semiconductor memory device, a Read-Only Memory (ROM), a flash memory, an erasable ROM (EROM), a floppy disk, a CD-ROM, an optical disk, a hard disk, a fiber optic medium, a radio frequency (RF) link, or the like. The code segments may be downloaded via a computer network such as an internet, an intranet, or the like.

It should also be noted that the exemplary embodiments mentioned in this application describe some methods or systems based on a series of steps or devices. However, the present application is not limited to the order of the above steps, that is, the steps may be performed in the order mentioned in the embodiments, or in an order different from the order in the embodiments, or several steps may be performed simultaneously.

Aspects of the present disclosure are described above with reference to flowcharts and/or block diagrams of methods, apparatus (systems) and computer program products according to the embodiments of the disclosure. It will be understood that each block of the flowchart and/or block diagrams and a combination of the blocks in the flowchart and/or block diagrams may be implemented by computer program instructions. These computer program instructions may be provided to a processor of a general purpose computer, special purpose computer, or other programmable data processing apparatus to produce a machine which enables the instructions executed via the processor of the computer or other programmable data processing apparatus to implement the functions/acts specified in one or more blocks of the flowcharts and/or block diagrams. Such processor may be, but not limited to, a general purpose processor, a special purpose processor, an application specific processor, or a field programmable logic circuit. It will further be understood that each block of the block diagrams and/or flowcharts and a combination of blocks in the block diagrams and/or flowchart may also be implemented by a special purpose hardware for performing specified functions or actions, or by a combination of a special purpose hardware and computer instructions.

The above are only specific implementations of the present application. Those skilled in the art may clearly understand that, for the convenience and brevity of description, the specific operation processes of the above-described systems, modules and units may refer to the foregoing method embodiments, which are not repeated herein. It should be understood that the protection scope of the present application is not limited to this. Any person skilled in the art may easily conceive of various equivalent modifications or replacements within the technical scope disclosed in the present application, and these modifications or replacements should all fall within the protection scope of this application.

What is claimed is:

1. A method for binding card, applicable to a terminal device comprising a security element, the method comprising:

obtaining a user identifier for logging in a target application by a user and a secure element identifier of the secure element, wherein the terminal device is a user terminal used by the user for a first time for binding card and contains no card information for the user, and the target application is on the user terminal of the user;

sending the user identifier without any card information to an authentication server, wherein the user identifier is for the authentication server to search at least one first card bound to the user identifier based on a preset binding relationship between at least one user identifier and cards stored on the authentication server;

after sending the user identifier to the authentication server and in responsive to a real-name authentication on the user based on the user identifier being determined by the authentication server to be not passed, receiving an identity information obtaining request sent by the authentication server;

in responsive to the identity information obtaining request, obtaining identity information of the user, wherein the identity information of the user includes at least an identification card number of the user and a biometric feature of the user;

sending the identity information to the authentication server for the authentication server to perform a real-name authentication on the user based on the identity information to confirm that the user of the terminal device is a real user as the user presented by the user identifier by matching the biometric feature of the user with biometric features stored in a database and to store, under a condition that the real-name authentication on the user based on the identity information is passed, a binding relationship between the user identifier and a result of the passed real-name authentication;

in responsive to the real-name authentication on the user being passed, receiving card information of the at least one first card sent by the authentication server; and sending a binding request to a card issuing server corresponding to the card information, wherein the binding request comprises the card information without the user entering any card information, the user identifier and the secure element identifier, and the binding request is for the card issuing server to bind the card information to the user identifier and the secure element identifier uniquely representing the terminal device such that the card information is bound to the terminal device being used by the user, wherein the receiving card information of the at least one first card sent by the authentication server further includes:

in responsive to the real-name authentication on the user being passed, the authentication server firstly finding at least one second card corresponding to the identity information of the user just passed the real-name authentication from the cards stored on the authentication server and then determining the at least one first card bound to the user identifier from the at least one second card under a condition that the real-name authentication on the user is determined to be passed based on the user identifier.

2. The method according to claim 1, wherein the biometric feature of the user is a face image of the user captured by the terminal device in real time.

3. The method according to claim 2, further comprising: sending the secure element identifier to the authentication server, so that the authentication server is to store and bind a result of the passed real-name authentication, the user identifier and the secure element identifier with one another.

4. The method according to claim 1, wherein responsive to the identity information obtaining request, obtaining identity information of the user comprises:

displaying an identity information acquisition interface on a screen of the terminal device in response to the identity information obtaining request; and receiving the identity information input by the user.

5. The method according to claim 1, wherein sending the binding request to the card issuing server corresponding to the card information comprises:

displaying each of pieces of the card information;

receiving an input for selecting the card information by the user; and sending, in response to the input, binding requests to card issuing servers corresponding to selected pieces of the card information respectively.

6. The method according to claim 1, wherein sending the binding request to the card issuing server corresponding to the card information comprises:

sending the binding request corresponding to the card information to a trusted service management (TSM) server, so that the TSM server is to send the binding request to the card issuing server corresponding to the card information.

7. A method for binding card, applicable to an authentication server, the method comprising:

receiving a user identifier sent by a terminal device and for logging in a target application by a user of the terminal device without any card information, wherein the terminal device is a user terminal used by the user for a first time for binding card and contains no card information for the user, and the target application is on the user terminal of the user;

in responsive to a real-name authentication on the user based on the user identifier being determined to be not passed, generating an identity information obtaining request;

sending the identity information obtaining request to the terminal device, so that the terminal device is to obtain identity information of the user, wherein the identity information of the user includes at least an identification card number of the user and a biometric feature of the user;

receiving the identity information sent by the terminal device;

performing a real-name authentication on the user based on the identity information to confirm that the user of the terminal device is a real user as the user presented by the user identifier by matching the biometric feature of the user with biometric features stored in a database;

in responsive to the real-name authentication on the user based on the identity information being determined to be passed, storing a binding relationship between the user identifier and a result of the passed real-name authentication;

in responsive to the real-name authentication on the user is passed, searching at least one first card bound to the user identifier; and sending card information of the at least one first card to the terminal device, wherein the card information is for the terminal device to send a binding request to a card issuing server corresponding to the card information, wherein the binding request comprises the card information without the user entering any card information, the user identifier and a secure element identifier of a secure element of the terminal device, and the binding request is for the card issuing server to bind the card information to the user identifier and the secure element identifier uniquely representing the terminal device such that the card information is bound to the terminal device being used by the user, wherein the searching at least one first card bound to the user identifier further includes:

in responsive to the real-name authentication on the user being passed, firstly finding at least one second card corresponding to the identity information of the user just passed the real-name authentication from cards stored on the authentication server; and then determining the at least one first card bound to the user identifier from the at least one second card under a condition that the real-name authentication on the user is determined to be passed based on the user identifier.

8. The method according to claim 7, wherein the biometric feature of the user is a face image of the user captured by the terminal device in real time.

9. The method according to claim 8, further comprising:

receiving the secure element identifier sent by the terminal device; and storing and binding a result of the passed real-name authentication, the user identifier and the secure element identifier with one another.

10. A terminal device comprising a secure element, comprising:

an obtaining module configured to obtain a user identifier for logging in a target application by a user and a secure element identifier of the secure element, wherein the terminal device is a user terminal used by the user for a first time for binding card and contains no card information for the user, and the target application is on the user terminal of the user;

a sending module configured to send the user identifier without any card information to an authentication server, wherein the user identifier is for the authentication server to search at least one first card bound to the user identifier based on a preset binding relationship between at least one user identifier and cards stored on the authentication server; and a receiving module configured to, in responsive to a real-name authentication on the user based on the user identifier being determined by the authentication server to be not passed, receive an identity information obtaining request sent by the authentication server;

wherein the obtaining module is further configured to, in responsive to the identity information obtaining request, obtain identity information of the user, wherein the identity information of the user includes at least an identification card number of the user and a biometric feature of the user;

the sending module is further configured to send the identity information to the authentication server for the authentication server to perform a real-name authentication on the user based on the identity information to confirm that the user of the terminal device is a real user as the user presented by the user identifier by matching the biometric feature of the user with biometric features stored in a database; to store, under a condition that the real-name authentication on the user based on the identity information is passed, a binding relationship between the user identifier and a result of the passed real-name authentication; to firstly find at least one second card corresponding to the identity information of the user just passed the real-name authentication from the cards stored on the authentication server; and to then determine the at least one first card bound to the user identifier from the at least one second card under a condition that the real-name authentication on the user is determined to be passed based on the user identifier;

the receiving module is further configured to, in responsive to the real-name authentication on the user being passed, receive card information of the at least one first card sent by the authentication server, the sending module is further configured to send a binding request to a card issuing server corresponding to the card information without the user entering any card information, wherein the binding request comprises the card information, the user identifier and the secure element identifier, and the binding request is for the card issuing server to bind the card information to the user identifier and the secure element identifier uniquely representing the terminal device such that the card information is bound to the terminal device being used by the user.

11. The terminal device according to claim 10, wherein the biometric feature of the user is a face image of the user captured by the terminal device in real time.

12. The terminal device according to claim 11, wherein the sending module is further configured to send the secure element identifier to the authentication server, so that the authentication server is to store and bind a result of the passed real-name authentication, the user identifier and the secure element identifier with one another.

13. The terminal device according to claim 11, wherein the obtaining module particularly comprises:

a first display unit configured to display an identity information acquisition interface on a screen of the terminal device in response to the identity information obtaining request; and a first receiving unit configured to receive the identity information input by the user.

14. The terminal device according to claim 10, wherein the sending module particularly comprises:

a second display unit configured to display each of pieces of the card information;

a second receiving unit configured to receive an input for selecting the card information by the user; and a first sending unit configured to send, in response to the input, binding requests to card issuing servers corresponding to selected pieces of the card information respectively.

15. The terminal device according to claim 10, wherein the sending module particularly comprises:

a second sending unit configured to send the binding request corresponding to the card information to a trusted service management TSM server, so that the TSM server is to send the binding request to the card issuing server corresponding to the card information.

16. The method according to claim 1, wherein the target application is an application for payment transaction.

17. The method according to claim 9, further comprising:

receiving the secure element identifier sent by the terminal device; and storing and binding a result of the passed real-name authentication, the user identifier and the secure element identifier with one another.

18. The method according to claim 8, wherein the target application is an application for payment transaction.

19. The terminal device according to claim 10, wherein the target application is an application for payment transaction.

* * * * *